US007050408B2

(12) United States Patent
Shen et al.

(10) Patent No.: US 7,050,408 B2
(45) Date of Patent: May 23, 2006

(54) COMMUNICATING MULTI-PART MESSAGES BETWEEN CELLULAR DEVICES USING A STANDARDIZED INTERFACE

(75) Inventors: Alan W. Shen, Seattle, WA (US); David L. A. Anson, Bellevue, WA (US); Roman Sherman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 09/963,988

(22) Filed: Sep. 26, 2001

(65) Prior Publication Data

US 2003/0058815 A1 Mar. 27, 2003

(51) Int. Cl.
*H04J 3/16* (2006.01)
*H04Q 7/20* (2006.01)

(52) U.S. Cl. ............ 370/329; 370/477; 370/465; 455/466

(58) Field of Classification Search ........ 370/329–349, 370/401–409, 465–469, 477; 455/412–466, 455/556–558; 719/328–331; 709/223–228, 709/238–240
See application file for complete search history.

(56) References Cited

U.S. PATENT DOCUMENTS

| | | | |
|---|---|---|---|
| 6,108,530 A * | 8/2000 | Ayabe et al. ............... 455/403 |
| 6,141,550 A * | 10/2000 | Ayabe et al. ............... 455/433 |
| 6,148,177 A | 11/2000 | Faris et al. ............... 455/31.1 |
| 6,269,254 B1 * | 7/2001 | Mathis ..................... 455/557 |
| 6,507,589 B1 * | 1/2003 | Ramasubramani et al. . 370/465 |
| 6,516,197 B1 * | 2/2003 | Havinis et al. ............. 455/456.1 |
| 6,868,274 B1 * | 3/2005 | Ayabe et al. ............... 455/466 |
| 2001/0042131 A1 * | 11/2001 | Mathon et al. ............ 709/238 |
| 2002/0042831 A1 * | 4/2002 | Capone et al. ............. 709/230 |
| 2002/0052968 A1 * | 5/2002 | Bonefas et al. ............ 709/231 |
| 2002/0156896 A1 * | 10/2002 | Lin et al. ................ 709/227 |
| 2004/0024610 A1 * | 2/2004 | Fradkov et al. ............ 705/1 |

FOREIGN PATENT DOCUMENTS

| EP | 1 107 618 | 6/2001 |
|---|---|---|
| WO | WO 00/74343 | 12/2000 |
| WO | WO 01/22750 | 3/2001 |

OTHER PUBLICATIONS

Title: Wireless messaging services for mobile users, Author Hua Min Tan, D.; Siu Cheung Hui; Chiew Tong Lau, Journal: Journal of Network and Computer Applications, vol. 24, No. 2, p. 151-66, Publication Date: Apr. 2001 Country of Publication: UK.

* cited by examiner

*Primary Examiner*—Man U. Phan
(74) *Attorney, Agent, or Firm*—Workman Nydegger

(57) ABSTRACT

Fragmentation and reassembly of a multi-part message for communication over a cellular network. When transmitting a multi-part message, a calling application issues a function call to a short messaging layer via a standardized interface. The function call represents a request to transmit the message. A short messaging layer divides the message into fragments of limited size that meet the size requirements of the cellular network. Each of the short messages is then transmitted across the cellular network. When receiving a multi-part message, a short messaging layer at the receiving device receives various short message fragments corresponding to the multi-part message. The short messaging layer then reassembles the short message fragments into the multi-part message, and then passes the reassembled multi-part message to the receiving application. The short message layer also presents a consolidated delivery report if requested.

38 Claims, 10 Drawing Sheets

COMMUNICATING MULTI-PART MESSAGES BETWEEN CELLULAR DEVICES USING A STANDARDIZED INTERFACE

BACKGROUND OF THE INVENTION

1. The Field of the Invention

The present invention relates to the field of cellular communications. Specifically, the present invention relates to methods, systems and computer program products for communicating multi-part messages between cellular devices using a standardized interface.

2. Background and Related Art

Communication is widely perceived to be an essential human need. It is generally thought that those who master the art of communication are often most likely to develop valuable relationships and otherwise expand their circle of influence in modem society. Perhaps for this reason, inventions that advance our ability to communicate are often perceived to have the largest contribution to our civilization. Thus, two of the most valued technical innovations in the modem era have been the telephone and the radio.

The advent of the telephone allowed individuals to audibly communicate in real-time over vast distances. Conventional telephones were "hard-wired" in that the telephonic device relied on a wired connection to communicate over a telephonic network with other telephonic devices. Accordingly, conventional telephones were relatively fixed to a particular location.

The advent of the radio allowed for the real-time communication of audible information without the use of wires. At its very core, conventional radio technology involves the use of an antenna for conversion of current signals into terrestrial airwave signals that are widely broadcast. A receiver within the range of the broadcast may then convert the terrestrial airwave signals back into the current signals preparatory to rendering the audio information via a speaker.

Wireless telephonic communication merges conventional radio and telephone technologies. Specifically, a wireless telephone includes an antenna for transmitting and receiving terrestrial airwave signals. Once a connection is established, a user may speak into the telephone. The voice information is then transmitted wirelessly using a predetermined transmission frequency to a receiver that is connected to a wired telephone network such as the traditional Public Switched Telephone Network (PSTN). Once received, the information is communicated through the connection in the wired telephone network to the other telephone. If the other telephone is wireless, then a transmitter receives the information and wirelessly transmits the information to the other telephone. The other telephone may communicate information back to the original telephone in the same manner.

Prior to cellular technology, wireless telephone communications involved radio telephones in which there was typically one central antenna tower for a relatively large area. This limited the number of channels that could be maintained for this relatively large area since each channel occupied given frequency ranges. Accordingly, only a few people could communicate via radio telephones at any given time in this relatively large area. In addition, due to the large area, the telephone transmission power needed to be significant. Accordingly, the radio telephones were quite large and bulky by today's standards, and thus used by relatively few.

Wireless telephone technology became widely available for the masses with the development of cellular technology. Cellular technology involves the spatial division of telephone use regions into relatively small areas called "cells" that may typically be in the range of ten square miles each. Each cell includes a base station for transmitting and receiving wireless signals to and from cellular telephones within the cell.

Each base station transmits and receives wireless signals using frequencies that are typically different than the frequencies used by the immediately surrounding cells, although more remote cells may indeed reuse the same frequencies. Thus, interference from surrounding cells is minimized and frequencies may be reused throughout the network, so long as the frequencies used at any given cell differ from its immediately surrounding cells. This allows for many more available channels and thus cellular networks support orders of magnitude more simultaneous calls than the earlier radio telephone networks.

In addition, since the cell areas are relatively small, the transmission power requirements are comparatively low, and thus the telephone battery size may be kept relatively small. Furthermore, with the high frequencies allocated for cellular communication, cellular antennas may be small as well. Accordingly, cellular telephones and cellular networks have emerged as the dominant means for wireless telephone communication.

Early cellular telephones were exclusively analog meaning that the telephone processed analog signals such as analog voice signals. Later, digital telephones also became available allowing for more efficient compression and encryption technologies to thereby improve the spectral efficiency associated with cellular channels. Digital telephones process information digitally and have been used not only to communicate voice information, but also to communicate text or data messages as well.

Typically, cellular networks support such text or data message communications. However, cellular networks limit the size of message fragments that may be communicated over the cellular network. For example, Global System for Mobile communications (or "GSM") cellular networks often offer a service called Short Message Service (SMS) in which messages up to 140 bytes are permitted. Many other cellular technologies also support similar short messaging services.

If the message exceeds a certain size, the message is divided into multiple short message fragments of limited size such that each of the short message fragments (along with any other header data) does not exceed the size allowance of the cellular network. The header data may include, for example, routing information, a message identifier that uniquely identifies the multi-part message, an indication of the number of short message fragments in the identified multi-part message, the order of the corresponding short message fragment in the multi-part message, and the like.

The process of fragmenting such multi-part messages into individual short message fragments is quite complex. For example, the permissible size of the short message fragment is not necessarily fixed, but depends on the size of the header information as well. Hereinafter, "a short message fragment" refers to a portion of text or data that was fragmented from the original larger message. A "short message" refers to a short message fragment along with accompanying header data.

For example, suppose a cellular network limits the size of short messages to 140 bytes. Although the size limit of the short message is 140 bytes, one simply cannot say that each short message fragment should be 140 bytes since the short message fragment will be accompanied by header information. If, for a given short message fragment, the ultimate size of the associated header information is 35 bytes, the absolute size limit for that short message fragment will be 105 bytes. If, for another short message fragment, the ultimate size of the associated header information is 45 bytes, the absolute size limit for that other short message fragment is 95 bytes.

In addition, as previously implied, fragmentation requires the formation of header information to allow for proper reassembly of the various short message fragments at the receiving cellular device. Thus, when including such header information, one must consider the capabilities of the receiving cellular device to interpret the header information. Also, since cellular networks may delivery short message fragments out of order, there should be ordering information included in the header. Thus, the implementation of these fragmentation and reassembly functions often involve significant coding effort.

Conventionally, any application that offered the communication of messages aver cellular networks had to individually deal with these non-trivial fragmentation and reassembly issues. Thus, each application provider needed to individually author code to address fragmentation and reassembly. Should standards for fragmentation and reassembly change or expand, each application provider would have to address the change. Therefore, what is desired are methods, systems, and computer program that relieve cellular application providers from having to author code that deals with fragmentation and reassembly of short message fragments.

SUMMARY OF THE INVENTION

Methods, systems, and computer program products are described that allow for fragmentation of a multi-part message into a number of short message fragments and transmission of such fragments over a cellular network without the transmitting application program dealing with the details required to perform such fragmentation. In addition, reassembly of a multi-part message is accomplished without the receiving application being concerned with the details involved with reassembly of short message fragments into a multi-part message.

When transmitting a multi-part message, a calling application issues a function call to a short messaging layer via a standardized interface such as an Application Program Interface (API) or user interface. The function call represents a request to transmit the message. After determining that the message is to large to transmit as a single short message, the short messaging layer divides the message into fragments of a sufficiently small size that adding header information will result in a short message that is within the size requirements of the cellular network. Each of the short messages are then transmitted across the cellular network.

If the calling application has also requested a delivery report, then the short messaging layer tracks delivery reports subsequently received for each of the short messages. Once all of the delivery reports for the short messages are received, the short messaging layer interprets the various delivery reports to determine an appropriate delivery report for the multi-part message as a whole. The short messaging layer then passes the appropriate delivery report back to the calling application.

When receiving a multi-part message, various short message fragments corresponding to the multi-part message are received by the short messaging layer. The short messaging layer then uses the header information associated with each of the short message fragments to assemble the short message fragments into the multi-part message. The short messaging layer then passes the reassembled multi-part message to the receiving application. Although this process may occur automatically without a request, in one embodiment, this service is provided via an express request to do so received from the receiving application.

Thus, when transmitting, receiving, or tracking delivery associated with a multi-part message, the application program need not be concerned with details involved with the limited size requirements of the underlying cellular network. Instead, the application program merely requests transmission of the multi-part message, receives the multi-part message, and optionally receives a delivery report for the multi-part message as a whole. Should standards change for transmitting or receiving multi-part messages, the application program need not change. Instead, the short messaging layer may be adapted to deal with the change in standards.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
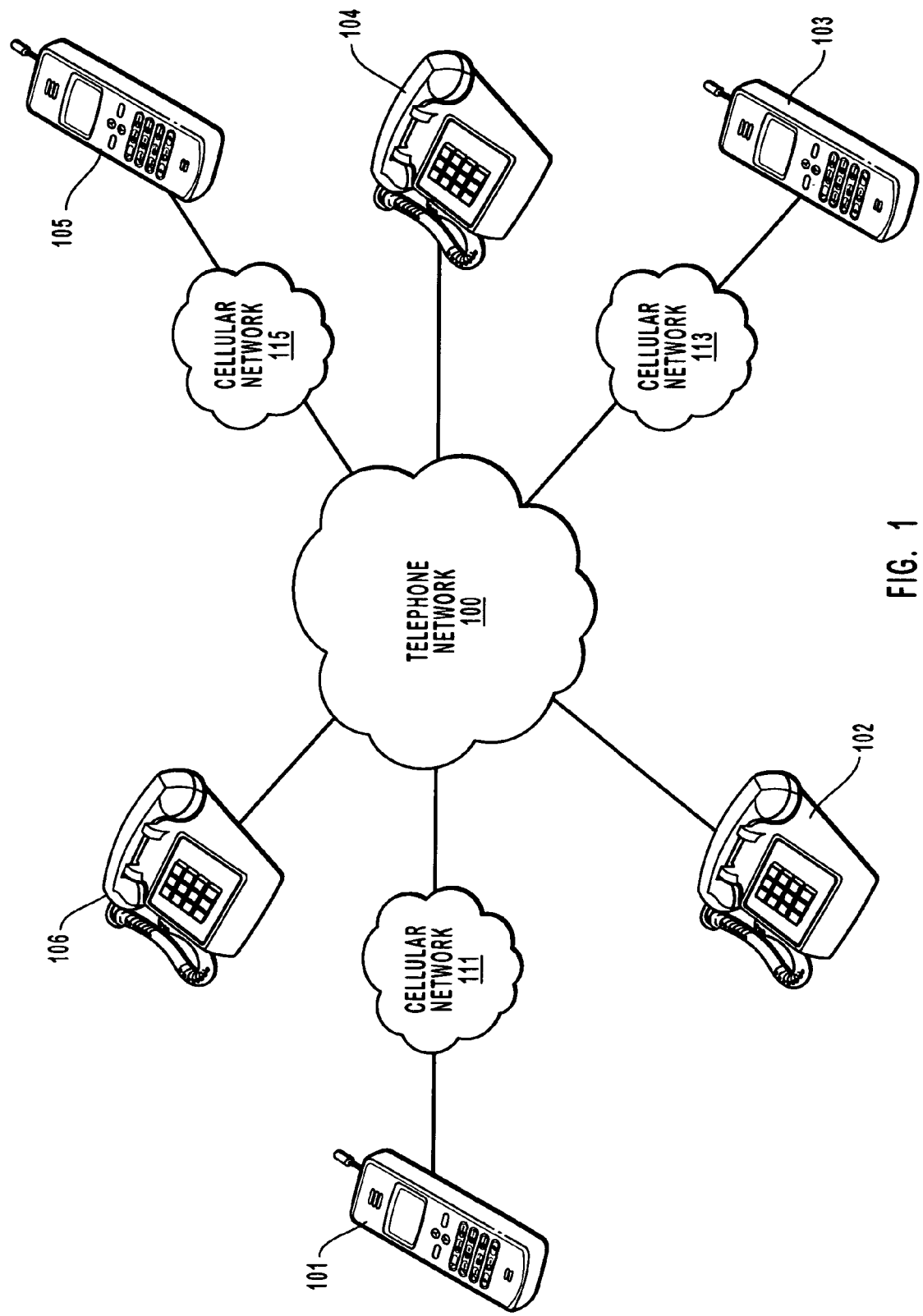
FIG. 1 schematically illustrates a telephone network in which the principles of the present invention may be implemented.

The present invention extends to methods, systems and computer program products for facilitating fragmentation and reassembly of multi-part messages for transmission over a cellular network without the application program having to implement the details necessary to fragment and reassemble the multi-part message. In particular, a calling application that is to transmit a multi-part message uses a standardized interface to request that a short messaging layer transmit the message. If the message is large enough, the short messaging layer fragments and transmits the message and, if requested, returns a unified delivery report for the multi-part message. On the receiving end, a short messaging layer reassembles the multi-part message and passes the assembled message to a receiving application, without the receiving application having to implement the details required to reassemble a multi-part message.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates, in simplified form, a telephone network 100 in which the present invention may operate. The telephone network 100 facilitates communication between a number of telephonic devices such as the illustrated telephonic devices 101 through 106. Some of the telephonic devices are cellular devices and thus communicate over the telephonic network via a cellular network. For example, telephonic devices 101, 103 and 105 are cellular devices and communicate with over the telephone network 100 using corresponding cellular networks 111, 113 and 115.

Cellular networks are often not only capable of communicating voice information, but are also capable of communicating other types of messages such as text and data messages. However, often such cellular networks limit the size of such messages. For example, Short Message Service (SMS) in Global System for Mobile communication (GSM) is one such message service. In addition, Time Division Multiple Access (TDMA), Code Division Multiple Access (CDMA), Wireless CDMA (WCDMA), 1xRTT, 3G, UMTS and CDMA2000, among others, are cellular technologies that enable the transmission of messages of limited size.

The present invention facilitates the fragmentation and reassembly of such messages when the size of the message so warrants. Note that although each of the telephonic devices 101 through 106 are illustrated in the conventional form of a telephone, a telephonic device may be any device capable of communicating over a telephonic network.

Figure 2:
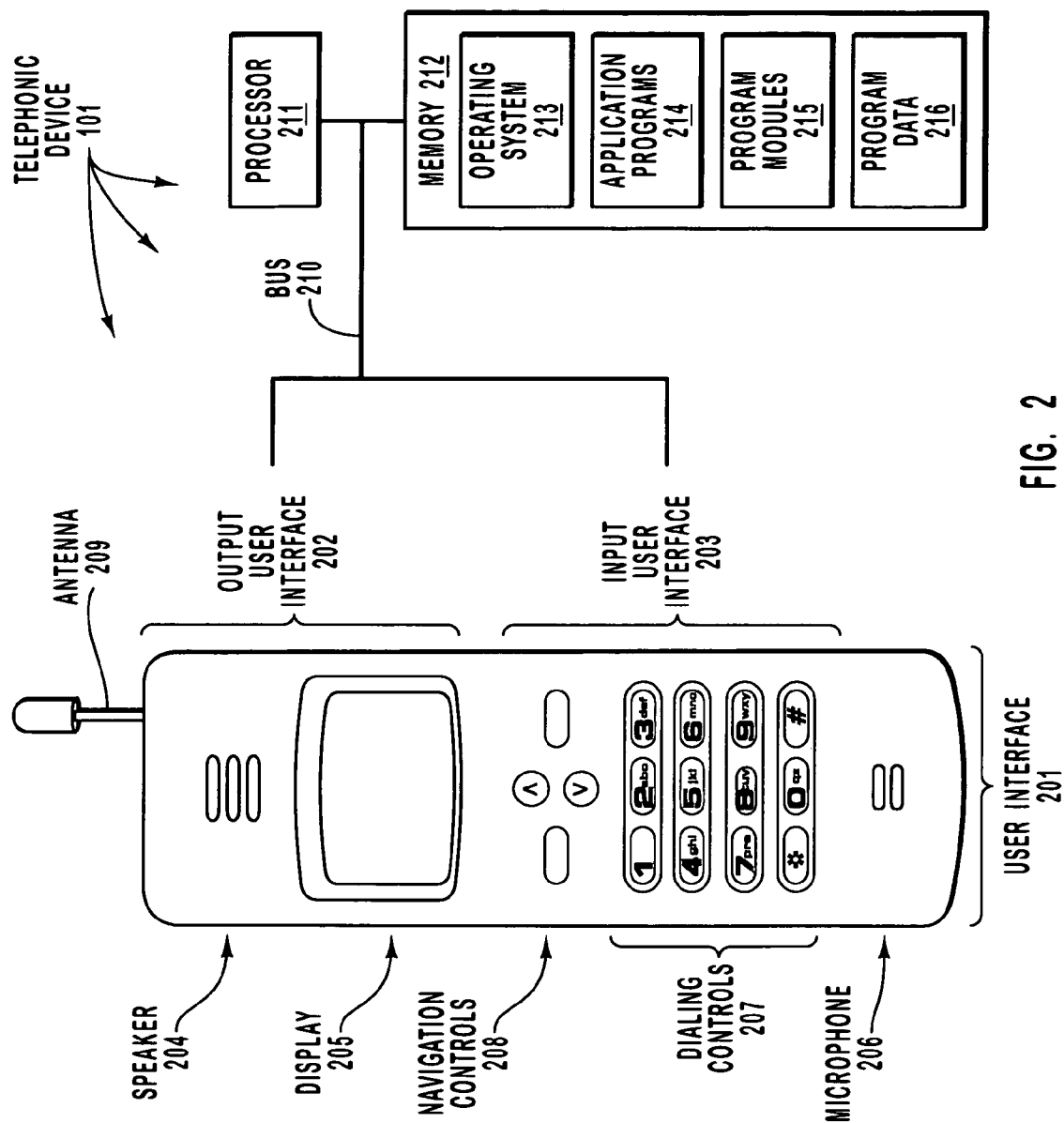
FIG. 2 illustrates the relevant hardware and software components of a telephonic device that may communicate over the cellular network of FIG. 1, and that may implement the principles of the present invention.

FIG. 2 illustrates one of the cellular telephonic devices (for example, telephonic device 101) in further detail, although the other cellular telephonic devices may have similar components. The telephonic device 101 represents a suitable cellular device for implementing the principles of the present invention, although the present invention is by no means limited to implementation by this telephonic device. The present invention may be implemented in any cellular device with suitable modification as described herein.

The telephonic device 101 includes a user interface 201 for allowing a user to input information through an input user interface 203, and review information presented via an output user interface 202. For example, the output user interface 202 includes a speaker 204 for presenting audio information to the user, as well as a display 205 for presenting visual information to the user. The telephonic device 101 also has an antenna 209 for wireless communication with the cellular network 111.

The input user interface 203 may include a microphone 206 for rendering audio information into electronic form. In addition, the input user interface 203 includes dialing controls 207 represented by 12 buttons through which a user may dial a telephone number, enter a text message, or instruct the telephonic device 101 to send a data message. Input user interface 203 also includes navigation control buttons 208 that assist the user in navigating through various entries and options that may be listed on display 205.

Although the telephonic device 101 has the appearance of a mobile telephone, the unseen features of the telephonic device 101 may allow for complex and flexible general-purpose processing capabilities. For example, the telephonic device 101 also includes a processor 211 and a memory 212 that are connected to each other and to the user interface 201 via a bus 210. The memory 212 generically represents a wide variety of volatile and/or non-volatile memories that may be employed. The particular type of memory used in the telephonic device 101 is not important to the present invention.

Program code means comprising one or more program modules may be stored in memory 212. The one of more program modules may include an operating system 213, one or more application programs 214, other program modules 215, and program data 216. The environment illustrated in FIG. 2 is illustrative only, and by no means represents even a small portion of the wide variety of cellular devices in which the principles of the present invention may be implemented.

Figure 3:
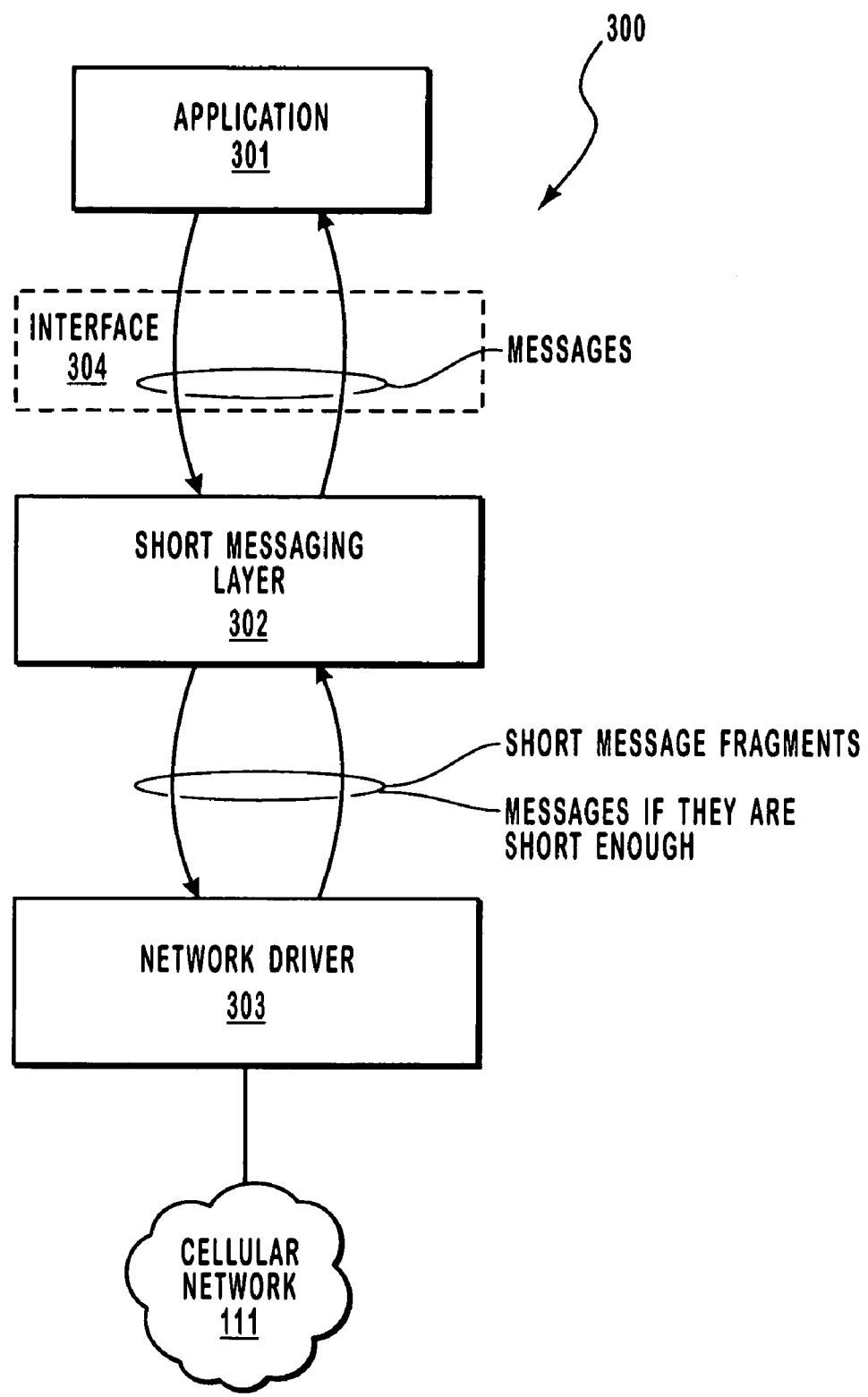
FIG. 3 illustrates an architecture that may be implemented on the telephonic device of FIG. 2 and that operates to relieve the application provider from having to implement the details of fragmentation and reassembly of a multi-part message.

FIG. 3 is an architectural diagram illustrating the interaction between various components implemented by a cellular device such as telephonic device 101 in accordance with the present invention. An application 301, which may be one of application programs 214, provides a service which requires a message be sent over a cellular network such as cellular network 111. Instead of the application 301 having to address all of the detailed requirements associated with transmission of a message over the cellular network, the application 301 issues a function call to the short messaging layer 302 requesting transmission of the message.

Figure 4:
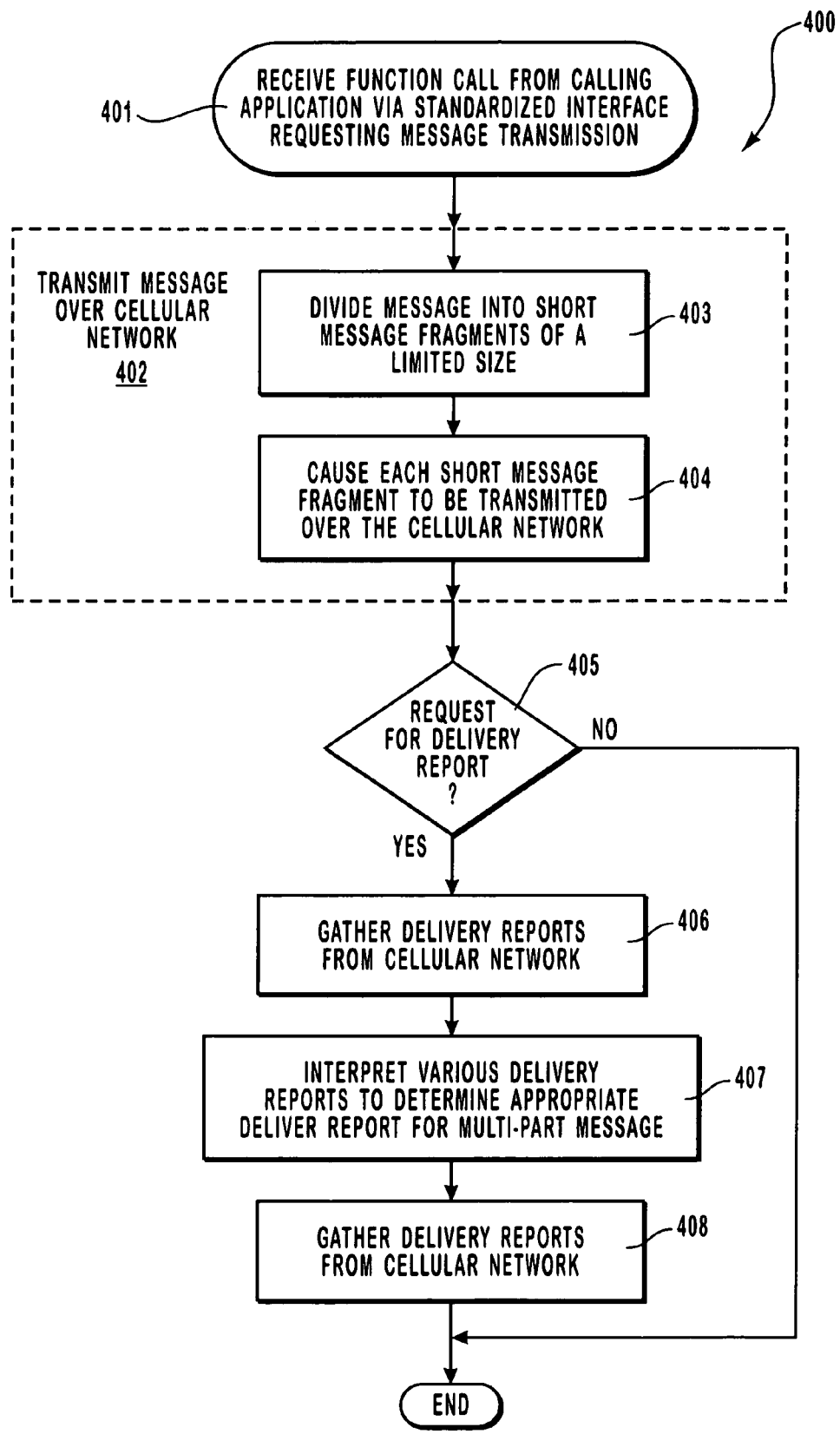
FIG. 4 illustrates a flowchart of a method for facilitating an application sending multiple short message fragments without having the calling application implement the detailed processing required to fragment the message.

The short messaging layer 302 then implements a method 400 illustrated in FIG. 4. FIG. 4 is a flowchart of a method for facilitating an application sending multiple short message fragments without having the calling application implement the detailed processing required to fragment the message. The method 400 includes an act of the short messaging layer 302 receiving a function call from the calling application 301 via a standardized interface 304 (act 401). The function call represents a request to transmit a message over the cellular network.

In this description and in the claims, a "function call" is defined as request for service front cue software module to another whether it be an automatic as a result of the operation of the calling software module, or whether the call is in response to user input to a standardized user interface, such as a user entering a command to transmit in a command line.

The short messaging layer 302 then performs a step for transmitting the message over the cellular network in response to the function call (step 402). The step 402 may include corresponding acts 403 and 404. Specifically, the short messaging layer 403 divides the message into a number of short message fragments of limited size (act 403) and then causes each of the short message fragments to be transmitted over the cellular network (act 404) via the network driver 303 of FIG. 3.

If the short messaging layer 302 received a request for a delivery report (YES in decision block 405, then the short messaging layer 302 gathers delivery reports for the short message fragments from the cellular network 111 (act 406) via the network driver 303. The various delivery reports are then interpreted to determine an appropriate delivery report for the multi-part message as a whole (act 407). The delivery report for the multi-part message is then returned to the application 301 via the standardized interface 304.

Figure 5A:
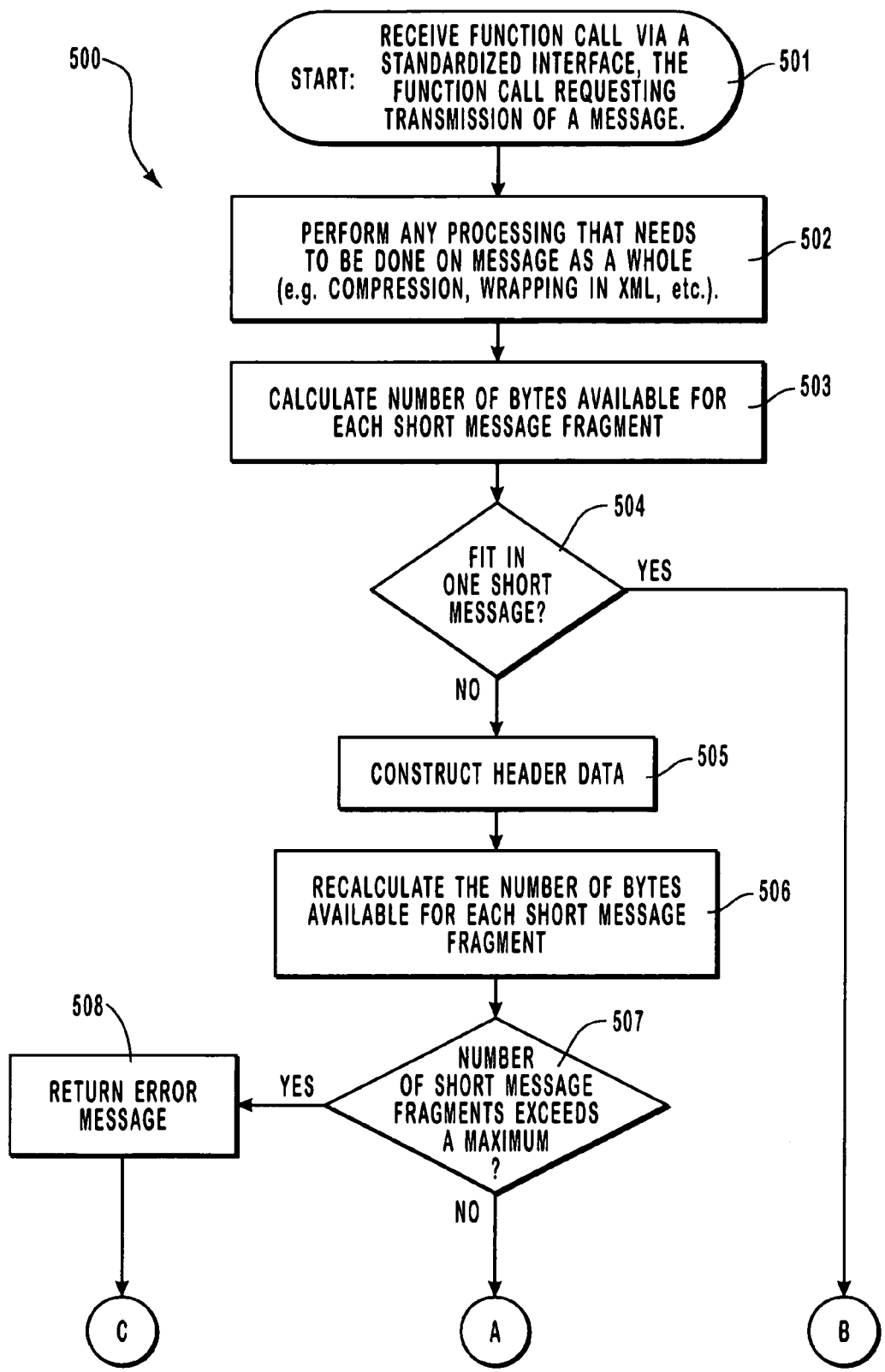
FIGS. 5A and 5B illustrates a more detailed flowchart for facilitating an application sending multiple short message fragments.
Figure 5B:
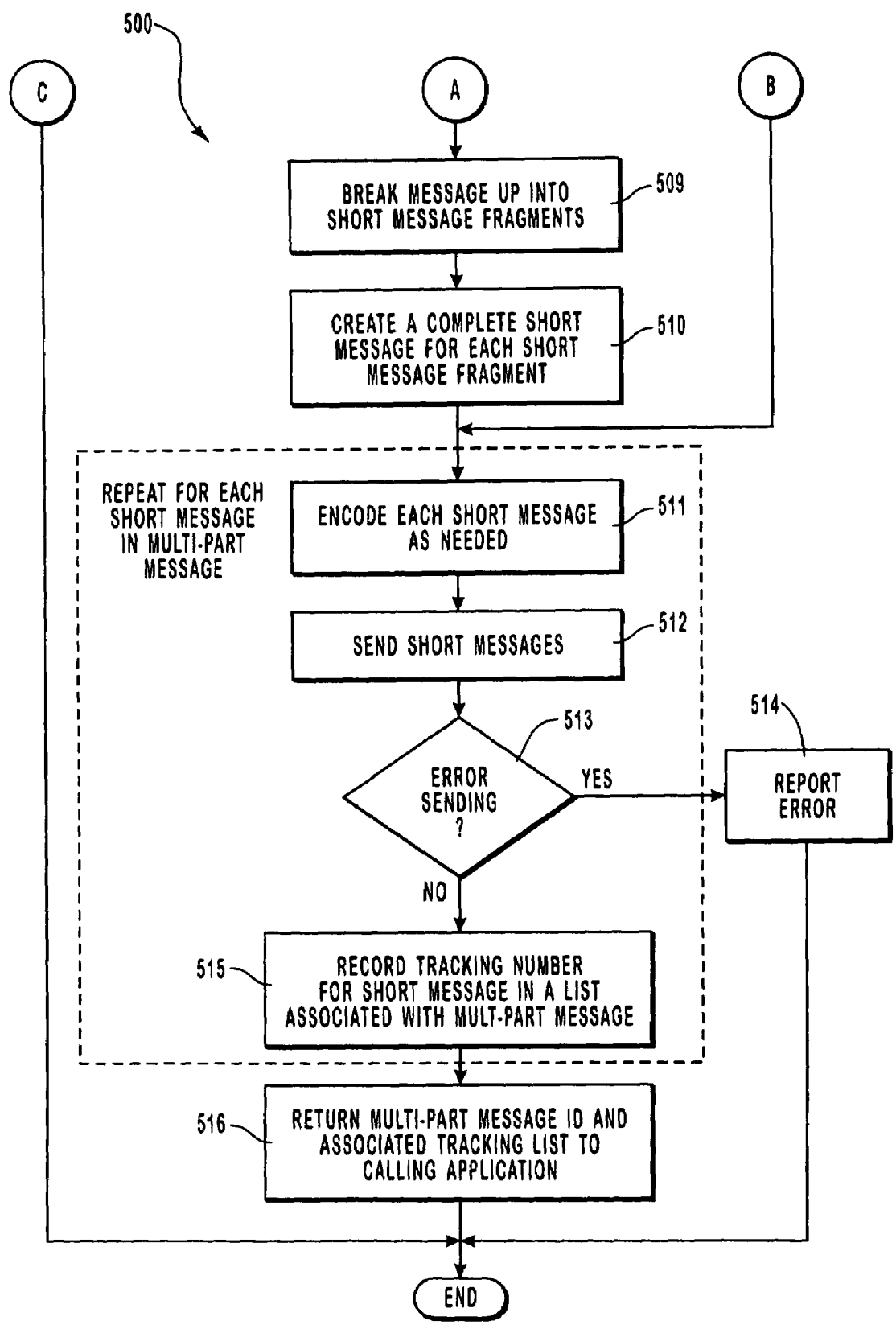

FIG. 5 is a more detailed flowchart that illustrates a specific embodiment of a method 500 for facilitating an application sending multiple short message fragments without having the calling application implement the detailed processing required to fragment the message. The method begins when the short messaging layer 302 receives a function call via a standardized interface requesting transmission of a message (act 501). Act 501 of FIG. 5 is analogous to act 401 of FIG. 4.

Next, the short messaging layer 302 performs any processing that needs to be done on the message as a whole (act 502). Such processing may include compression of the message, wrapping the messaging in eXtensible Markup Language (XML), encryption and the like.

The short messaging layer 302 then calculates the number of bytes available for each short message fragment based on the type of message (act 503). For example, a text message may be permitted to have short messages of a certain size while Wireless Application Protocol (or "WAP") message may have short messages of a different size.

The short messaging layer 302 then determines if the message could fit below the maximum permissible size set by the cellular network using a single message (decision block 504). If not (NO in decision block 504), then the message is treated as a multi-part message. Specifically, the short messaging layer 302 constructs header information that would assist in reassembling the corresponding short message fragments into the original message (act 505). Such header information may include, for example, an identification of the multi-part message, the number of short message fragments in the multi-part message, and the order of the associated short message fragment in the multi-part message.

This additional header information, of course, changes the allowable size of the raw short message fragment. The short messaging layer 302 then recalculates the maximum allowable size of a short message fragment (act 506) considering the newly constructing ordering header information. For example, suppose the cellular network allowed for a maximum short message size of 140 bytes given the type of message. Now suppose the ordering header information is 20 bytes. The allowable size of the short message fragment with the ordering header information would only be 120 bytes.

Suppose that the maximum short message fragment size is calculated to be 120 bytes. If the message (after performing any processing on the message as a whole in act 502) is 620 bytes, then 6 short messages will be needed to transmit the complete multi-part messages. Some cellular networks or applications limit the number of short messages that may be associated with a single multi-part message. For example, GSM networks are currently limited to 255 short message fragments per multi-part message. If the number of short messages would exceed the maximum allowable (YES in decision block 507), then an appropriate error message is returned to the calling application (act 508). Otherwise (NO in decision block 507), the message is fragmented into the multiple short message fragments (act 509) using the maximum size of the fragments calculated in act 506. After the multi-part message has been fragmented in act 509, a complete short message is constructed for each short message fragment. This may include appending or prepending the appropriate header information constructed in act 505.

After the short messages have been constructed for each short message fragment in the multi-part message (i.e., after act 510), or after it has been determined that the message may be transmitted as a single short message (YES in decision block 504), each of the one or more short messages is encoded as needed in order to be transmitted over the cellular network (act 511). This functionality may be incorporated in the network driver 303 or may be instead implemented by the short messaging layer 302. After encoding (act 511) each short message may be transmitted over the cellular network (act 512) using, for example, the network driver 303.

Figure 9:
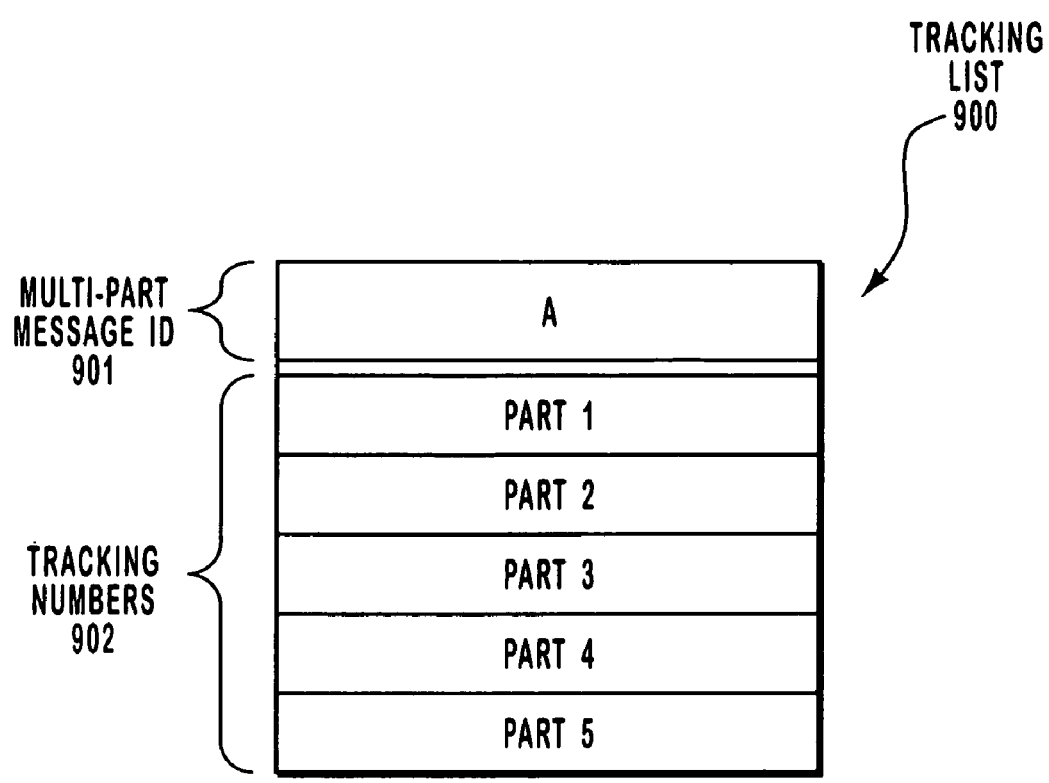
FIG. 9 illustrates a data structure of a tracking list used to provide a unified delivery report for a multi-part message.

If there is an error sending any of the short messages (YES in decision block 513), then an error is reported (act 514) and the process ends. Otherwise (NO in decision block 513), a tracking number for each corresponding short message is included in a tracking list associated with the multi-part message (act 515). The structure of a tracking list is illustrated in FIG. 9 as tracking list 900. The tracking list 900 includes a field 901 that represents the identification of the multi-part message (e.g., "A"), and fields 902 that identify each short message in the multi-part message (e.g., parts 1 through 5 of 5). The illustrated identifications in FIG. 9 are human readable for clarity. The actual identification may be any binary sequence that identifies the corresponding fields to the telephonic device 101. The short messaging layer 302 then returns the tracking list to the calling application (act 516) and awaits delivery reports for each short message.

Figure 6:
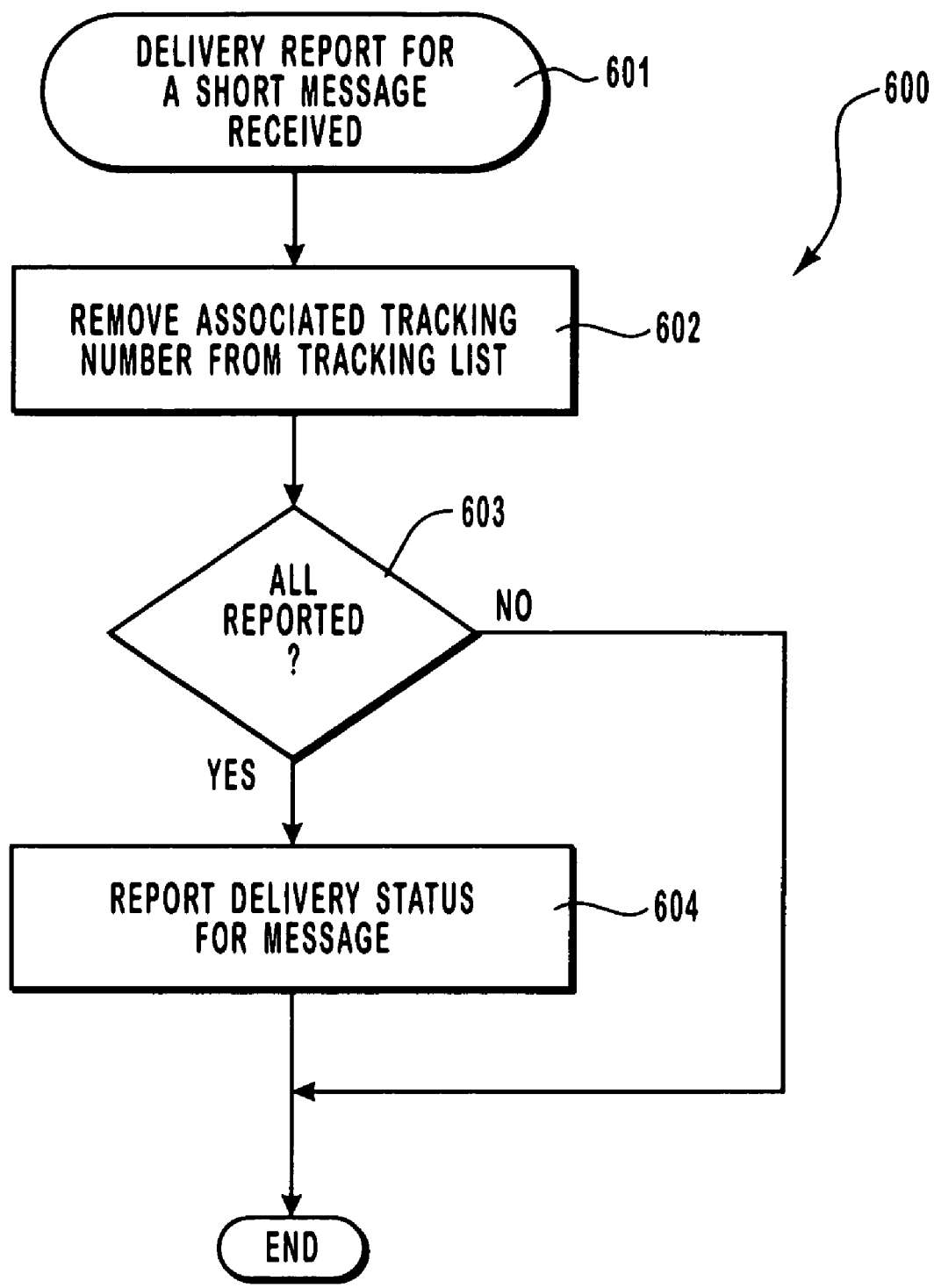
FIG. 6 illustrates a flowchart of a method for responding to delivery reports for short messages.

FIG. 6 illustrates a flowchart of a method 600 for how the short messaging layer 302 responds to delivery reports for short messages. When a delivery report for a short message is received (act 601), the short messaging layer 302 removes the tracking number associated with the short message from the tracking list (act 602). If delivery reports for less than all of the short messages have been received (NO in decision block 603), then the process ends until further delivery reports are received.

If delivery reports for all of the short messages corresponding to the multi-part message have been received (YES in decision block 603), then delivery status for the entire multi-part message is reported (act 604). If any of the short messages were reported as not delivered, then the short messaging layer 302 may attempt to resend the fragment. If ultimately less than all of the fragments were reported as delivered, even after any reattempts, then the multi-part message delivery report may indicate an error corresponding to "message not delivered" or something similar. On the other hand, if all of the short messages were reported as delivered, then the multi-part message delivery reported may indicate a success code corresponding to "message delivered".

In this manner, the calling application 301 simply issued a function call to send a message and received a single delivery report back if requested. The calling application 301 did not need to deal with the many details involved with fragmenting the message into multiple short messages. Also, the calling application 301 did not have to be concerned with interpreting delivery reports for individual message fragments. Instead, the calling application 301 received a single report for the message. Accordingly, the calling application 301 need not be aware of anything other than that it requested a message to be sent, and that it received a message delivery report back if it was requested.

Figure 7:
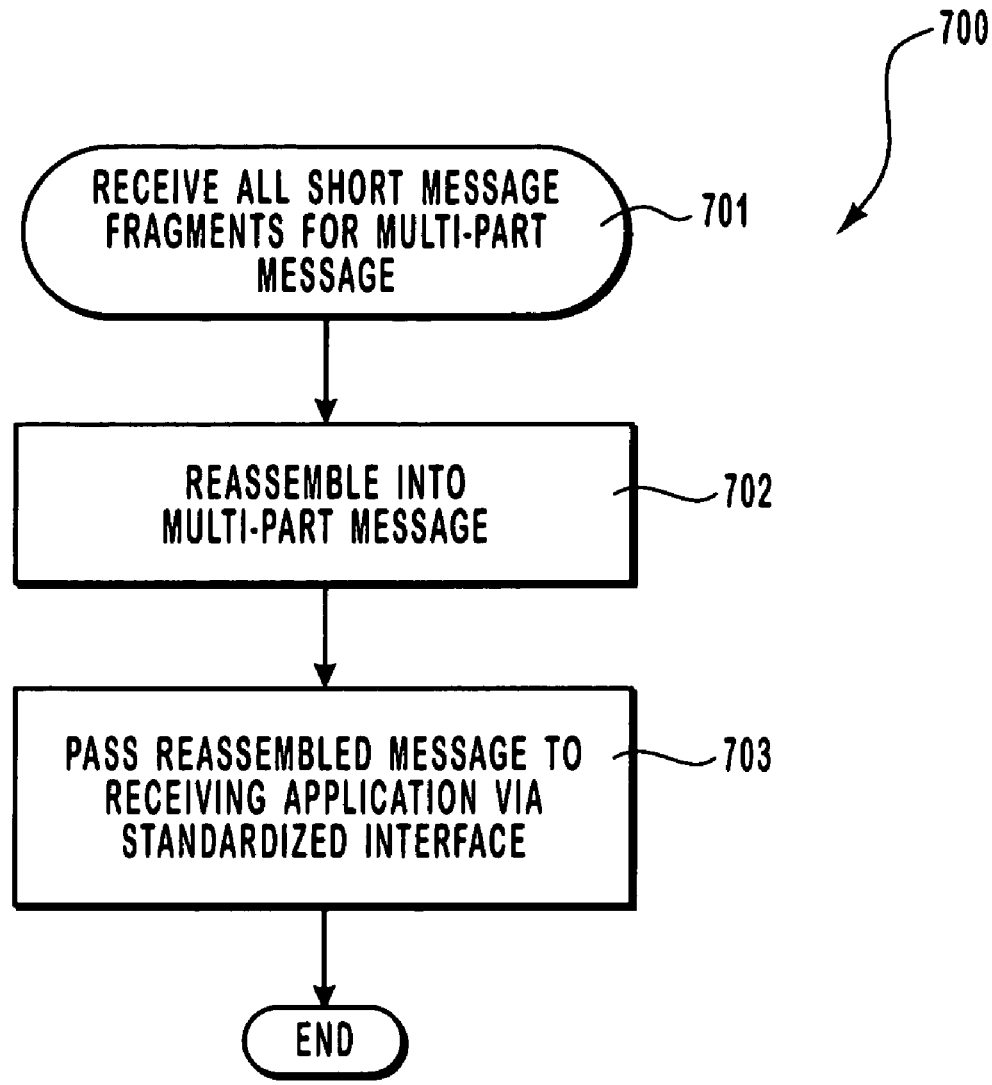
FIG. 7 illustrates a flowchart of a method for receiving a multi-part message in a manner that the receiving application does not have to implement the detailed processing necessary to reassemble the message.

The same architecture of FIG. 3 that was used to send a multi-part message may also be used to receive a multi-part message. FIG. 7 illustrates a method 700 for receiving a multi-part message in a manner that a receiving application (e.g., application 301) does not have to perform the detailed processing necessary to reassemble the message. First, the short messaging layer 302 receives a number of short message fragments corresponding to a multi-part message (act 701), reassembles the number of short message fragments into the multi-part message (act 702), and passes the reassembled message to the receiving application via a structured standardized interface (act 703). The short messaging layer 302 may have performed the method 700 in response to an express request to do so received from the receiving application via the standardized interface.

Figure 8:
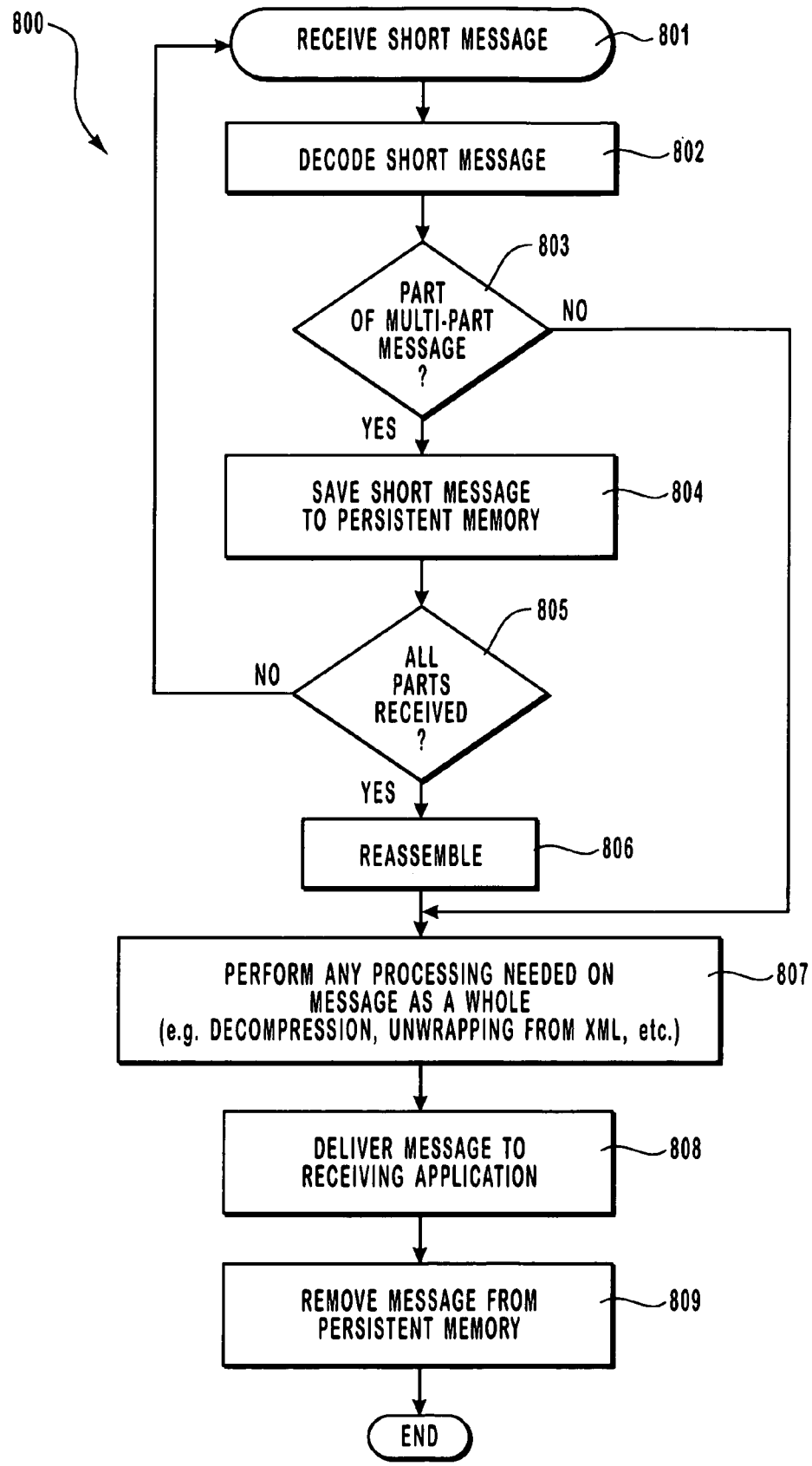
FIG. 8 illustrates a more detailed flowchart of a method for receiving a multi-part message in a manner that the receiving application does not have to implement the detailed processing necessary to reassemble the message.

FIG. 8 illustrates a flowchart of a more specific method 800 for receiving a multi-part message in a manner that a receiving application does not have to perform the detailed processing necessary to reassemble the message. The method 800 is initiated when a short message is received (act 801) via, for example, the network driver 303. The short message is then decoded as needed (act 802). This decoding process is essentially the inverse of the encoding process performed in act 511 of FIG. 5B.

The header information for the short message is then consulted to determine whether the short message is part of a multi-part message (decision block 803). If so (YES in decision block 803), the short message is saved to persistent memory (act 804) to protect against losing data in case of a power interruption while only part of the multi-part message is received.

Then, the header information is again consulted to determine if all of the short messages corresponding to the multi-part message have been received (decision block 805). If less than all of the short messages have been received (NO in decision block 805), then the process returns to act 801 to await the next short message. If, on the other hand, all of the short messages for the multi-part message have been received (YES in decision block 805), then the header information is used to reassemble the short message fragments into a single multi-part message (act 806).

Then, the short messaging layer 302 performs any processing that is needed on the message as a whole such as decompression, unwrapping from XML, or decryption (act 807), delivers the message to the receiving application via the standardized interface 304 (act 808), and then removes the short messages from the persistent memory (act 809).

When receiving the multi-part message, the receiving application remains unaware of the detailed associated with reassembly of the various short message fragments into the multi-part message. Instead, these services are provided by the short messaging layer 302.

Accordingly, the principles of the present invention allow for an application to send multi-part messages over a cellular network without the application having to implement the detailed processing required for fragmentation and reassembly of multi-part messages. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a cellular network that facilitates transmission of messages between cellular computing devices, the messages often being multi-part messages that consist of multiple short message fragments of limited size, a method for facilitating an application sending the multiple short message fragments without having a calling application implement detailed processing required to fragment the message, the method comprising the following:

an act of receiving a function call from a calling application via a standardized interface, the function call requesting the transmission of a first message over the cellular network;

an act of dividing the first message into a set of short message fragments of limited size;

an act of causing each of the short message fragments to be transmitted over the cellular network; and wherein the calling application is adapted to act as a receiving application for a second message reassembled from a second set of short message fragments.

2. A method in accordance with claim 1, wherein the act of receiving a function call from a calling application via a standardized interface comprises the following:

an act of receiving a function call from a calling application via an application program interface.

3. A method in accordance with claim 1, wherein the act of the receiving a function call from a calling application via a standardized interface comprises the following:

an act of receiving a function call from a standardized user interface.

4. A method in accordance claim 1, further comprising the following:

an act of processing the message prior to the act of dividing the message into a number of short message fragments.

5. A method in accordance with claim 4, wherein the act of processing the message comprises the following:

an act of compressing the message.

6. A method in accordance with claim 4, wherein the act of processing the message comprises the following:

an act of encrypting the message.

7. A method in accordance with claim 4, wherein the act of processing the message comprises the following:

an act of wrapping the message in XML.

8. A method in accordance with claim 1, further comprising the following prior to the act of dividing the message into a number of short message fragments of limited size:

an act of determining that the message must be transmitted as a plurality of short messages in order to comply with a size restriction of the cellular network.

9. A method in accordance with claim 1, wherein the cellular network is a Global System for Mobile communication (GSM) cellular network.

10. A method in accordance with claim 1, wherein the cellular network implements TDMA cellular technology.

11. A method in accordance with claim 1, wherein the cellular network implements CDMA technology.

12. A method in accordance with claim 1, wherein the cellular network implements wireless CDMA technology.

13. A method in accordance with claim 1, wherein the cellular network implements 1xRTT technology.

14. A method in accordance with claim 1, wherein the cellular network implements 3G technology.

15. A method in accordance with claim 1, wherein the cellular network implements UMTS technology.

16. A method in accordance with claim 1, wherein the cellular network implements CDMA2000 technology.

17. In a cellular network that facilitates transmission of messages between cellular computing devices, the messages often being multi-part message that consist of multiple short message fragments of limited size, a method for calling application implement detailed processing required to fragment the message, the method comprising the following:

an act of receiving a function call from a calling application via a standardized interface, the function call requesting the transmission of a message over the cellular network;

an act of dividing the message into a number of short message fragments of limited size;

an act of causing each of the short message fragments to be transmitted over the cellular network;

an act of receiving a request for a delivery report for the message from the calling application;

an act of gathering delivery reports received back from the communication network for each short message fragment;

an act of interpreting the gathered delivery reports for each of the short message fragments to determine an appropriate delivery response for the message as a whole; and an act of returning the appropriate delivery response for the message as a whole to the calling application.

18. A method in accordance with claim 17, wherein the act of receiving a request for a delivery report is performed via the standardized interface.

19. A method in accordance with claim 17, wherein the act of returning the appropriate delivery response is performed via the standardized interface.

20. A computer program product for use in a cellular network that facilitates the transmission of messages between cellular computing devices, the messages often being multi-part messages that consist of multiple short message fragments of limited size, the computer program product for implementing a method for facilitating an application sending the multiple short message fragments without having a calling application implement detailed processing required to fragment the message, the computer program product comprising one or more computer-readable media having stored thereon the following:

computer-executable instructions for receiving a function call from a calling application via a standardized interface, the function call requesting the transmission of a message over the cellular network;

computer-executable instructions for dividing the message into a set of short message fragments of limited size; and computer-executable instructions for causing each of the short message fragments to be transmitted over the cellular network; and wherein the calling application is adapted to act as a receiving application for a second message reassembled from a second set of short message fragments.

21. A computer program product in accordance with claim 20, wherein the one or more computer-readable media are physical storage media.

22. A computer program product in accordance with claim 20, wherein the computer-executable instructions for receiving a function call from a calling application via a standardized interface comprise the following:

computer-executable instructions for receiving a function call from a calling application via an application program interface.

23. A computer program product in accordance with claim 20, wherein the computer-executable instructions for receiving a function call from a calling application via a standardized interface comprise the following:

computer-executable instructions for receiving a function call from a standardized user interface.

24. A computer program product in accordance with claim 20, wherein the one or more computer-readable media further have stored thereon the following:

computer-executable instructions for determining that the message must be transmitted as a plurality of short messages in order to comply with a size restriction of the cellular network prior to executing the computer-executable instructions for dividing the message into a number of short message fragments of limited size.

25. A computer program product for use in a cellular network that facilitates transmission of message between cellular computing devices, the messages often being multi-part messages that consist of multiple short message fragments of limited size, the computer program product for implementing a method for facilitating an application sending the multiple short message fragments without having a calling application implemented detailed processing required to fragment the message, the computer program product comprising one or more computer-readable media having stored thereon the following:

computer-executable instructions for receiving a function call from a calling application via standardized interface, the function call requesting the transmission of a message over the cellular network;

computer-executable instructions for dividing the message into a number of short message fragments of limited size;

computer-executable instructions for causing each of the short message fragments to be transmitted over the cellular network;

computer-excusable instructions for receiving a request for a delivery report for the message from the calling application;

computer-executable instructions for gathering delivery reports received back from the communication network for each short message fragment;

computer-executable instructions for interpreting the gathered delivery reports for each of the short message fragments to determine an appropriate delivery response for the message as a whole; and computer-executable instructions for returning the appropriate delivery response for the message a whole to the calling application.

26. In a cellular network that facilitates transmission of messages between cellular computing devices, the messages often being multi-part messages that consist of multiple short message fragments of limited size, a method for facilitating an application sending the multiple short message fragments without having a calling application implement detailed processing required to fragment the message, the method comprising the following:

an act of receiving a function call from a calling application via a standardized interface, the function call requesting the transmission of a first message over the cellular network, wherein the calling application is configured to act as a receiving application for a second message reassembled from a set of short message fragments; and a step for transmitting the message over the cellular network in response to the function call.

27. A method in accordance with claim 26, wherein the step for transmitting the message over the cellular network in response to the function call comprises the following:

an act of dividing the message into a number of short message fragments of limited size; and an act of causing each of the short message fragments of the first message to be transmitted over the cellular network.

28. In a cellular network that facilitates transmission of messages between cellular computing devices, the messages often being multi-part messages that consist of multiple short message fragments of limited size, a method for a receiving application to receive a multi-part message, the method comprising the following:

an act of receiving a plurality of short message fragments corresponding to a multi-part message;

an act of reassembling the plurality of fragments into the multi-part message; and an act of passing the reassembled message to a receiving application via a standardized interface, wherein the receiving application is adapted to act as a calling application for s second multi-part message.

29. A method in accordance with claim 28, wherein the act of passing the reassembled message to a receiving application via a standardized interface comprises the following:

an act of passing the reassembled message to a user interface.

30. A method in accordance with claim 28, wherein the act of passing the reassembled message to a receiving application via a standardized interface comprises the following:

an act of passing the reassembled message to a receiving application via an application program interface.

31. A method in accordance with claim 28, further comprising the following:

receiving a function call from the receiving application via a standardized interface, the function call requesting the processing and forwarding of complete multi-part messages.

32. A computer program product for use in a cellular network that facilitates transmission of messages between cellular computing devices, the messages often being multi-part messages that consist of multiple short message fragments of limited size, the computer program product for implementing a method for a receiving application to receive a multi-part message without performing the detailed processing necessary to reassemble the message, the computer program product comprising one or more computer-readable media having stored thereon the following:

computer-executable instructions for receiving a plurality of short message fragments corresponding to a multi-part message;

computer-executable instructions for reassembling the plurality of fragments into the multi-part message; and computer-executable instructions for passing the reassembled message to a receiving application via a standardized interface, wherein in receiving application is adapted to act as a calling application for a second multi-part message.

33. A computer program product in accordance with claim 32, wherein the computer-executable instructions for passing the reassembled message to a receiving application via a standardized interface comprise the following:

computer-executable instructions for passing the reassembled message to a user interface.

34. A computer program product in accordance with claim 32, wherein the computer-executable instructions for passing the reassembled message to a receiving application via a standardized interface comprise the following:
  computer-executable instructions for passing the reassembled message to a receiving application via an application program interface.

35. A computer program product in accordance with claim 32, wherein the one or more computer-readable media further have stored thereon the following:
  computer-executable instructions for receiving a function call from the receiving application via a standardized interface, the function call requesting the processing and forwarding of complete multi-part messages.

36. A computer program product in accordance with claim 32, wherein the one or more computer-readable media are physical storage media.

37. A method as recited in claim 1, further comprising:
  an act of the calling application receiving a delivery response for the first message as a whole.

38. A method as recited in claim 1, wherein each of the acts of receiving the function call and dividing the first message are performed by a short messaging layer.

* * * * *